United States Patent [19]

Miyazawa

[11] Patent Number: 4,584,607
[45] Date of Patent: Apr. 22, 1986

[54] PHOTOELECTRIC ELEMENT CONTROL SYSTEM
[75] Inventor: Hideyuki Miyazawa, Kawasaki, Japan
[73] Assignee: Ricoh Company, Ltd., Japan
[21] Appl. No.: 600,475
[22] Filed: Apr. 16, 1984
[30] Foreign Application Priority Data Apr. 14, 1983 [JP] Japan ................... 58-65974

[51] Int. Cl.[4] ..................... H04N 5/30; H04N 1/024
[52] U.S. Cl. ..................... 358/209; 358/212; 358/294
[58] Field of Search .............. 358/212, 213, 294, 293; 250/578; 357/24 LR

[56] References Cited

U.S. PATENT DOCUMENTS

4,424,590   1/1984   Ozawa ...................... 358/213
4,482,804  11/1984   Oritsuki et al. ............ 358/294
4,499,384   2/1985   Segawa et al. ............. 358/213
4,500,927   2/1985   Ozawa ...................... 358/212

Primary Examiner—Gene Z. Rubinson
Assistant Examiner—S. Brinich
Attorney, Agent, or Firm—Guy W. Shoup

[57] ABSTRACT

An image sensor includes a plurality of photoelectric elements arranged in the form of an array and a like plurality of blocking diodes, each of which is connected in series with and opposite in direction to the corresponding one of said photoelectric elements thereby forming a charge accumulating unit. The image sensor also includes means for setting long and short charge accumulating time periods, whereby when the long charge accumulating time period is set, a combined signal including a true signal and the dark current signal is outputted and when the short charge accumulating time period is set, only the dark current signal is outputted. Thus, when a difference is taken between these two signals, there is obtained an output signal free of the dark current component 7 Claims, 9 Drawing Figures

PHOTOELECTRIC ELEMENT CONTROL SYSTEM

BACKGROUND OF THE INVENTION

1. Field of the Invention

This invention generally relates to a system for controlling the operation of a photoelectric element and particularly to a control system for the operation of an array of photoelectric elements, such as a line sensor for use in optical reading of an original image. More specifically, the present invention is concerned with a photoelectric element control system of the charge storage type in which a relatively large signal is obtained by storing the charge produced by irradiation of light over a predetermined time period.

2. Description of the Prior Art

In facsimile machines, optical readers and the like, use is made of an image sensor having a plurality of photoelectric elements arranged linearly or in a two-dimensional matrix form for reading an original image thereby converting optical image information into electrical image information. In such a photoelectric array, in order to minimize the number of connection lines to simplify the structure of its control circuit, the connection lines for respective photoelectric elements are divided into groups and the connection lines in the same group are commonly connected. With such a structure, a predetermined voltage is sequentially applied to the groups of photoelectric elements one after another to carry out the so-called matrix control. In addition, since the signal reading time period per pixel or dot is relatively short in this type of image sensor, the time period other than the signal reading time period is used for storage of charge produced by irradiation of light. It is often so structured that a predetermined bias voltage is applied to the photoelectric element to have it reverse-biased during the charge storage time period.

Figure 1A:
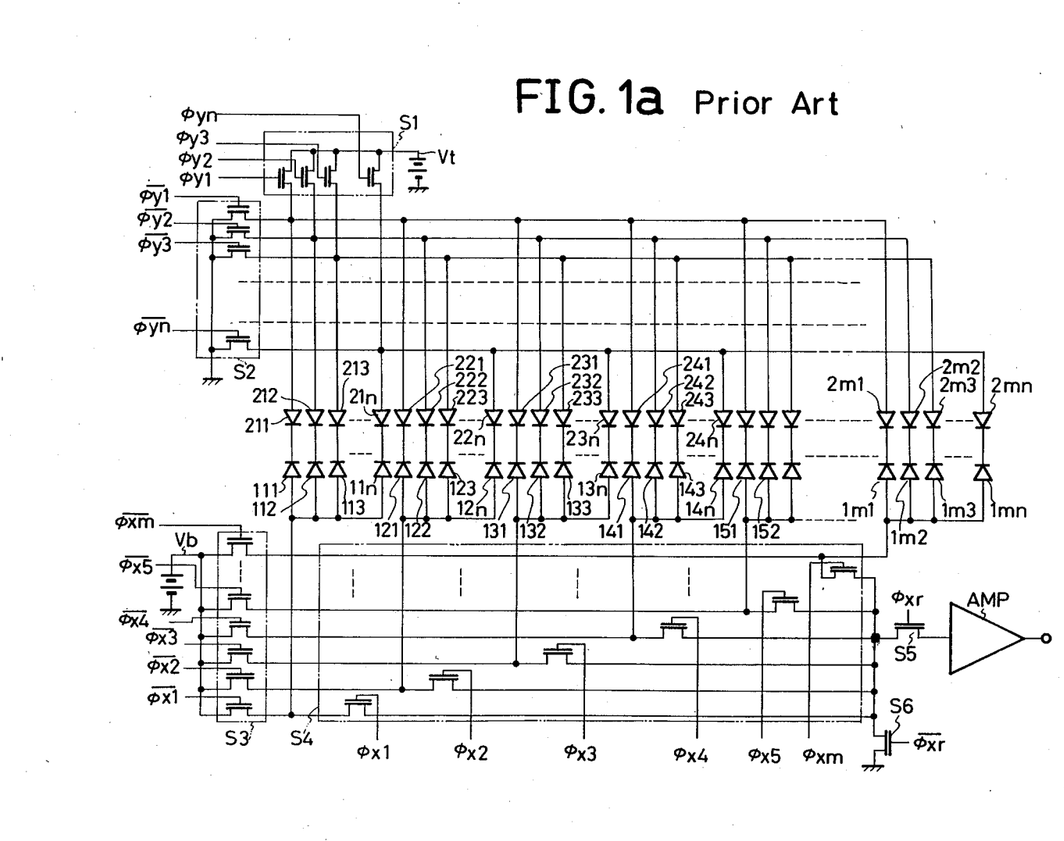
FIG. 1a is a circuit diagram illustrating the typical prior art image sensor generally comprised of a linear array of photoelectric elements and its peripheral circuit.

The typical prior art image sensor including a plurality of linearly arranged photoelectric elements is illustrated in FIG. 1a. As shown, the image sensor includes a plurality of photoelectric elements 111, 112, 13, . . . , 11n, 121, 122, . . . , 12n, 131, 132, . . . , 1mn, which are arranged linearly and divided into m number of groups, each group including n number of photoelectric elements whose anodes are commonly connected to the corresponding row line. Thus, there are m number of row lines. The image sensor also includes a like plurality of blocking diodes 211, 212, 213, . . . , 21n, 221, 222, 22n, 231, 232, . . . , 2mn, which are connected in series but opposite in direction to the corresponding photoelectric elements, respectively. Every n number of blocking diodes have their anodes commonly connected to the corresponding column line, and, thus, each column line is connected to m number of blocking diodes, one in each of n number of groups. It is thus clear that there are n number of column lines, to which are connected n number of switching elements S1 for controlling the application of read out voltage Vt and n number of switching elements S2 for controlling the application of ground potential.

Also provided as connected to the row lines are m number of switching elements S3 for controlling the application of charge storing voltage Vb and m number of switching elements S4 for selecting the row lines for operation. The switching elements S4 have their output terminals commonly connected to input terminals of a signal outputting switching element S5 and of a grounding switching element S6. And an amplifier AMP is provided with its input terminal connected to the output terminal of switching element S5. Each of the switching elements S1 through S6 is turned on when a control signal supplied is Hi and turned off when the control signal is Lo. As is commonly practiced, a character with overline indicates the complementary state of the binary state of the corresponding character without overline.

Figure 1B:
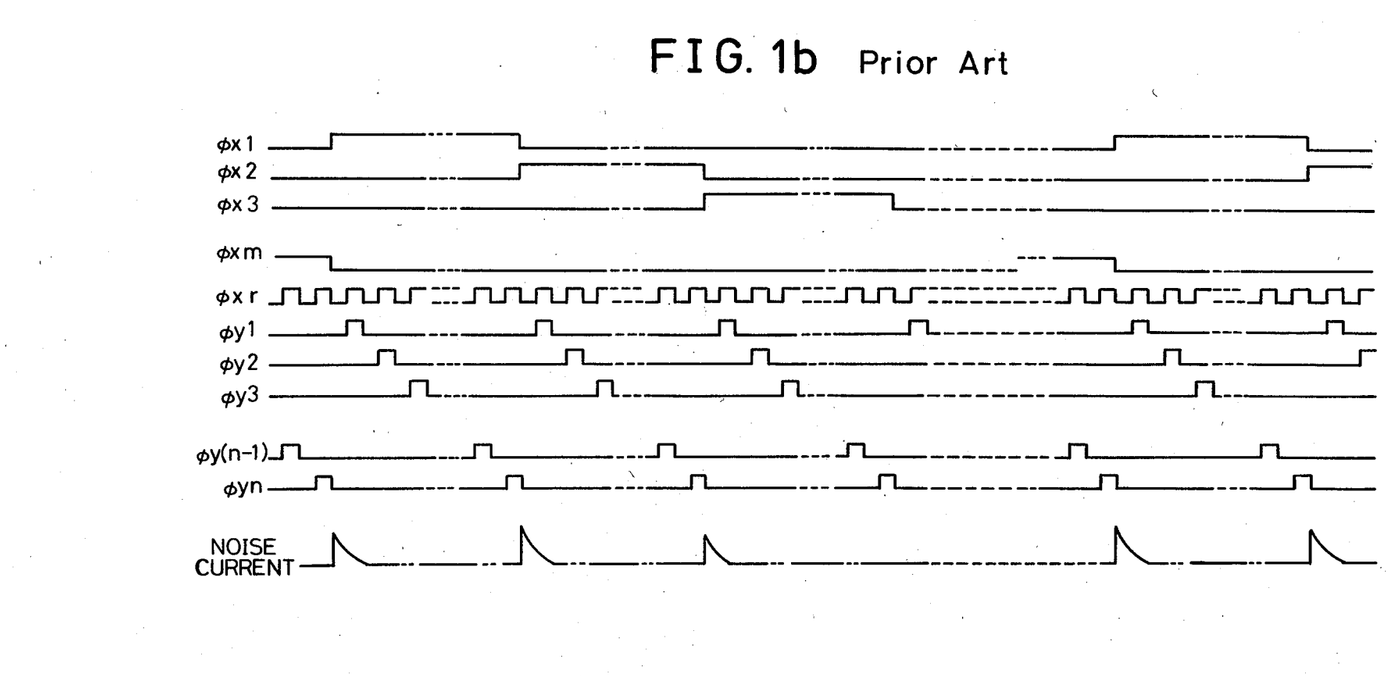

Now, the operation of the structure shown in FIG. 1a will be described also referring to FIG. 1b. If no signal reading takes place, the condition is established with all of the switches S1 off, all of the switches S2 on, all of the switches S3 on, all of the switches S4 off, the switch S5 off and the switch S6 on. Accordingly, the blocking diodes 2ab, where a ranges between 1 and n and b ranges between 1 and n, have their anodes grounded and voltage Vb is applied to the anodes of photoelectric elements 1ab. Under the condition, charge is accumulated in each of photoelectric cells in accordance with the amount of light irradiation.

If the signal reading operation is to be carried out sequentially starting from the photoelectric cell located at first row and first column, voltage Vb is first removed from the first row line and this row line is selected (i.e., $\phi x1$ being Hi) as an output line. Then, after elapsing a predetermined time period, the voltage Vt is sequentially applied (i.e., $\phi yb$ being Hi) to each of the column lines at a predetermined friquency, whereby the output end of each of the row lines is connected to the amplifier AMP (i.e., $\phi xr$ being Hi) at that frequency. Upon completion of signal reading for the first row, voltage Vb is again applied to the first row line and at the same time voltage Vb is removed from the second row line so that the second row line is now selected as an output line. Then, similarly with the case for the first row, voltage Vt is sequentially applied to each of the column lines.

While signal reading is carried out in this manner, charge is accumulated in the parasitic capacitor present in each of the photoelectric cells owing to voltage Vb applied thereto during charge accumulation time period. The charge thus accumulated in the parasitic capacitor is discharged as soon as the photoelectric element is set in a signal reading mode. Thus, if signal reading is carried out immediately after setting the photoelectric element in a signal reading mode, the current associated with the parasitic capacitor comes to be mingled with an image signal read as a noise. For this reason, it is common practice to carry out an actual signal reading operation after elapsing of a sufficient time for the noise component to be discharged upon setting of a signal reading mode for photoelectric element. However, the longer this wait time, the slower the image reading speed; on the contrary, the shorter this wait time, the more the noise component in the signal read.

In general, since a relatively small current (dark or noise current) flows through the photoelectric element even without light irradiation, a reading error will result if one tries to associate the output signal directly to light intensity. Such a dark current varies depending upon the surrounding temperature or the like so that the signal level cannot be accurately compensated for even if various current components are simply subjected to addition or subtraction.

SUMMARY OF THE INVENTION

It is therefore a primary object of the present invention to provide an improved image sensor.

Another object of the present invention is to provide an improved system for controlling the operation of a photoelectric element.

A further object of the present invention is to provide an improved system for controlling the operation of a plurality of photoelectric elements arranged in either one-dimensional or two-dimensional array.

A further object of the present invention is to provide an improved image sensor capable of accurately extracting a signal component even if the dark current level fluctuates.

A still further object of the present invention is to provide an improved image sensor including a plurality of photoelectric elements and capable of rejecting noises produced when the parasitic capacitors associated with connection lines or the like are discharged in matrix-driving the elements.

A still further object of the present invention is to provide a high-speed image sensor by minimizing its wait time.

Other objects, advantages and novel features of the present invention will become apparent from the following detailed description of the invention when considered in conjunction with the accompanying drawings.

BRIEF DESCRIPTION OF THE DRAWINGS

FIG. 1b is a timing chart which is useful for understanding the operation of the structure shown in FIG. 1a;

DESCRIPTION OF THE PREFERRED EMBODIMENTS

In operating a photoelectric element in a charge storage mode, the amount of charge stored in a charge storage unit including the photoelectric element is determined by a product of light intensity and charge storing time. If the thus accumulated charge is read out as a signal, it contains not only the signal level contributed by the accumulated charge but also the signal level contributed by the dark current. Focusing on the signal component, since its level is proportional to the charge storing time, if this charge storing time is quite short, the signal level is substantially at zero irrespective of light intensity. On the other hand, even in the case where the charge storing time is very short, the dark current level changes very little.

Therefore, in the case where there are set two different charge storing time periods such that one of them is relatively shorter with the other relatively longer, during the long charge storing time period, there is obtained an output signal whose level is a sum of the inherent signal level and the dark current signal level; on the other hand, during the short charge storing time period, there is obtained an output signal whose level corresponds to the dark current signal level. And, thus, if a resultant signal is obtained as a difference between these output signals, it is free of the dark current component.

If a plurality of photoelectric elements are arranged in the form of an array and matrix-driven, it is necessary to apply a so-called back gate voltage Vb to each of the photoelectric elements to establish a desired bias condition in order to carry out an image reading operation, i.e., charge accumulation. That is, during the charge accumulation mode, both of the photoelectric element and the blocking diode must be reverse-biased thereby establishing the condition in which the amount of charge at the junction between the photoelectric element and the blocking diode remains unchanged unless it is subjected to light irradiation. However, in the case of matrix driving operation, since the signal read out voltage Vt is periodically applied, it is necessary to keep the back gate voltage Vb applied so as to maintain the reverse-biased condition. In other words, it is not necessary to apply voltage Vb if the signal read out voltage Vt is not applied. However, customarily, in the case of matrix-driving a line sensor including 64 photoelectric elements, since provision was made of 8 row lines and 8 column lines, the 8 column lines were scanned one after another by applying Vt while selecting one of the 8 row lines, so that the signal read out voltage Vt was repetitively applied at a relatively short time period to one end of each of the photoelectric elements, thereby necessitating the application of back gate voltage Vb.

Under the circumstances, if 8 row lines and 16 column lines are provided for an image sensor having 64 photoelectric elements and the column lines are divided into two groups, each comprised of 8 lines, while being connected to different rows, the signal read out voltage Vt is not applied to the group of elements connected to b row lines while carrying out a signal read out operation for the group of elements connected to a row lines (i.e., applying Vt and inhibiting the application of Vb), so that no problem arises even if the back gate voltage Vb is removed during this time period.

If a line is grounded with removal of the back gate voltage Vb therefrom, the charge accumulated in the parasitic capacitor associated with this line becomes discharged. Thus, after removing the back gate voltage Vb simultaneously from a plurality of groups of row lines, if the signal read out voltage Vt is applied to the column lines which correspond to one group of row lines and a signal read out inhibit voltage, e.g., ground potential, is applied to the column lines which correspond to another group of row lines, the array of photoelectric elements may be operated partly in a signal read out mode and partly in a noise charge discharge mode. Under the condition, if it is so controlled that the signal read out mode immediately follows the noise charge discharge mode, the parasitic capacitors may be discharged during a relatively long time period for reading approximately a single line. Accordingly, there is no need to provide a wait time period for eliminating noise current before the signal read out mode.

Figure 2:
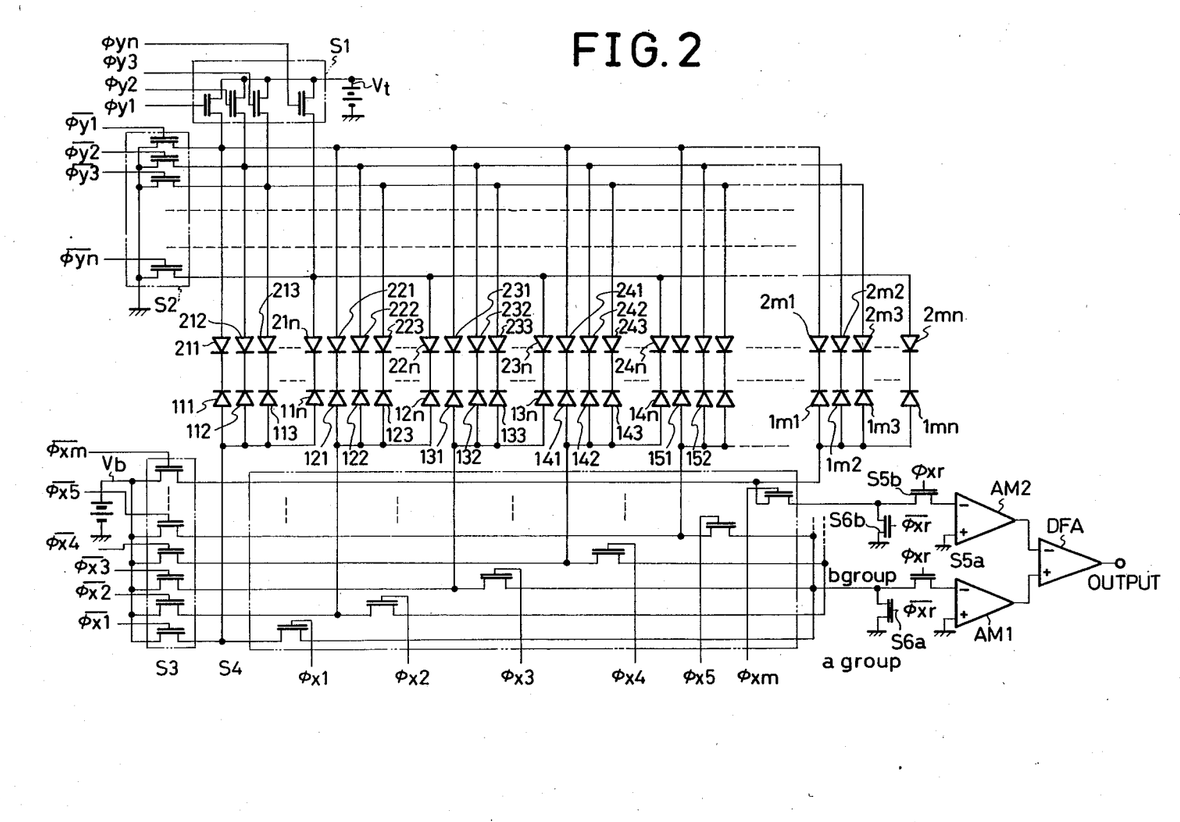
FIG. 2 is a circuit diagram illustrating the overall structure of an image sensor constructed in accordance with one embodiment of the present invention.

Referring now to FIG. 2, there is shown an image sensor constructed in accordance with one embodiment of the present invention. As shown, similarly with the case of FIG. 1a, the image sensor includes a plurality of photoelectric elements 111, 112, 113, ..., 11n, 121, 122, ..., 12n, 131, 132, ..., 1mn as arranged in the form of linear array. In the illustrated example, use is made of photodiodes as the photoelectric elements for converting light image information into electrical image information. The sensor also includes a like plurality of blocking diodes 211, 212, 213, ..., 21n, 221, 222, ..., 22n, 231, 232, ..., 2mn, each of which is connected to the corresponding photoelectric element in series but opposite in direction.

A driving circuit provided as connected to the anodes of photodiodes 1MN, where M ranges between 1 and m and N ranges between 1 and n, includes switching elements S3 and S4 as in the case of FIG. 1a. However, the output terminals of switching elements S4 are divided into two groups, i.e., a group and b group, and they are commonly connected in each group. There are provided switching elements S5a and S6a as connected to the output terminal of group a; on the other hand, switching elements S5b and S6b are provided as connected to the output terminal of group b.

Also provided are current amplifiers AM1 and AM2 which are connected to the output terminals of switching elements S5a and S5b, respectively, and whose output terminals are connected to respective input terminals of a differential amplifier DFA. One terminal of each of the switching elements S6a and S6b is connected to ground.

The peripheral circuit connected to the anodes of blocking diodes 2MN is identical to that shown in FIG. 1a. Briefly described, every n numbers of blocking diodes, one in each of m number of groups, are commonly connected and thus there are defined n number of column lines. There are provided n number of switching elements S1, each of which is connected between voltage Vt and the corresponding column line, and n number of switching elements S2, each of which is connected between ground and the corresponding column line.

Figure 3A:
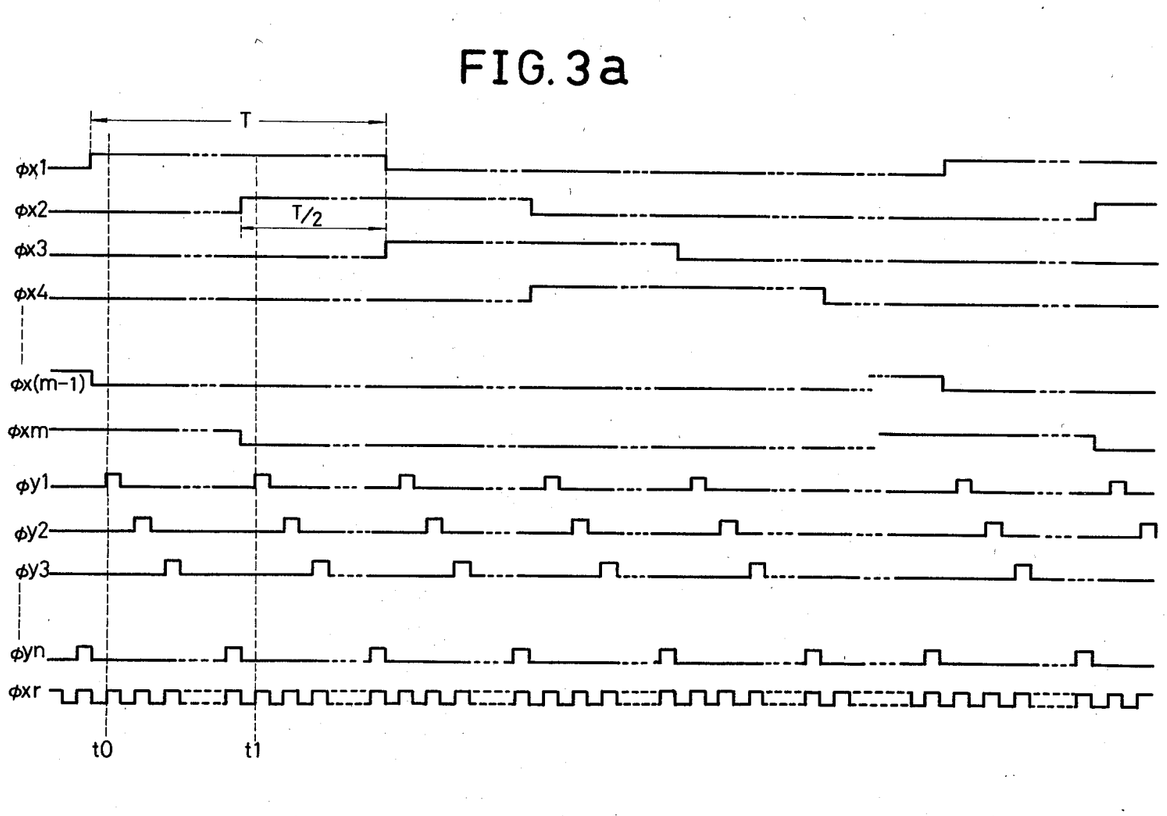
FIG. 3a is a timing chart which is useful for understanding the operation of the structure shown in FIG. 2.
Figure 3B:
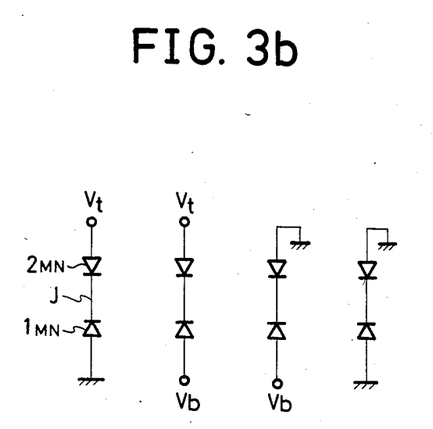
FIG. 3b is a schematic illustration showing the several conditions of a single charge storage unit comprised of a photoelectric element and a blocking diode, which are connected in series but opposite in direction, in the structure of FIG. 2.

FIG. 3a is a timing chart showing the timing of various signals to be applied to the structure of FIG. 2. FIG. 3b is a schematic illustration showing several conditions in which various voltages are applied between the anodes of photodiode 1MN and blocking diode 2MN which are connected in series and opposite in direction thereby defining a charge storage unit. For the purpose of convenience, the leftmost condition, in which the anode of photodiode 1MN is grounded and voltage Vt is applied to the anode of blocking diode 2MN, will be referred to as a first bias condition (or signal read out condition); the second from the leftmost condition, in which voltage Vb is applied to the anode of photodiode 1MN and voltage Vt is applied to the anode of blocking diode 2MN, will be referred to as a second bias condition; the third from the leftmost condition, in which voltage Vb is applied to the anode of photodiode 1MN and the anode of blocking diode 2MN is grounded, will be referred to as a third bias condition; and the rightmost condition, in which both of the anodes of photodiode 1MN and blocking diode 2MN are grounded, will be referred to as a fourth bias condition.

A combined structure of photodiode 1MN and blocking diode 2MN is set in one of the four bias conditions shown in FIG. 3b in accordance with a signal applied to each of the switching elements, and by repetitively changing the bias condition of the combined structure in a predetermined sequence, the accumulation of charge pursuant to a light image and the read out of an image signal are carried out in repetition for each of the photodiodes.

Now, the condition of a signal in each of the above-described bias conditions will be described. The following table 1 shows, in each of the four bias conditions, charge Qj stored at junction J between photodiode 1MN and blocking diode 2MN, voltage Vj at junction J, and charge Qa accumulated in the equivalent electrostatic capacitance Ca of photodiode 1MN. In table 1, Vd indicates a forward biased voltage drop of blocking diode 2MN, Cd indicates the equivalent electrostatic capacitance of blocking diode 2MN and Iph indicates a current flowing through photodiode 1MN due to irradiation of light.

TABLE 1

| Bias Cond. | Anode of 1MN | Anode of 2MN | Condition of signal |
|---|---|---|---|
| 1 | 0 | Vt | Charge Qj: $C_a(V_t - V_d) - V_d \cdot C_d$ <br> Voltage Vj: $V_t - V_d$ <br> Charge Qa: $C_a(V_t - V_d)$ |
| 2 | Vb | Vt | Charge Qj: $C_a(V_t - V_d) - V_d \cdot C_d - I_{ph} \cdot t$ <br> Voltage Vj: $$V_t - V_d + \frac{C_a \cdot V_b}{C_a + C_d} - \frac{I_{ph} \cdot t}{C_a + C_d}$$ <br> Charge Qa: $$C_a\left(V_t - V_d - \frac{C_d \cdot V_b}{C_a + C_d} - \frac{I_{ph} \cdot t}{C_a + C_d}\right)$$ |
| 3 | Vb | 0 | Charge Qj: $C_a(V_t - V_d) - V_d \cdot C_d - I_{ph} \cdot t$ <br> Voltage Vj: |

TABLE 1-continued

| Bias Cond. | Anode of 1MN | Anode of 2MN | Condition of signal |
|---|---|---|---|
| | | | $\dfrac{Ca \cdot Vt}{Ca + Cd} - Vd + \dfrac{Ca \cdot Vb}{Ca + Cd} - \dfrac{Iph \cdot t}{Ca + Cd}$ |
| | | | Charge Qa: |
| | | | $Ca\left(\dfrac{Ca \cdot Vt}{Ca + Cd} - Vd - \dfrac{Cd \cdot Vb}{Ca + Cd} - \dfrac{Iph \cdot t}{Ca + Cd}\right)$ |
| 4 | 0 | 0 | Charge Qj: $Ca(Vt - Vd) - Vd \cdot Cd - Iph \cdot t$ |
| | | | Voltage Vj: |
| | | | $\dfrac{Ca \cdot Vt}{Ca + Cd} - Vd - \dfrac{Iph \cdot t}{Ca + Cd}$ |
| | | | Charge Qa: |
| | | | $Ca\left(\dfrac{Ca \cdot Vt}{Ca + Cd} - Vd - \dfrac{Iph \cdot t}{Ca + Cd}\right)$ |

When set in the first bias condition, the anode of photodiode 1MN is grounded and its cathode receives the voltage minus the forward voltage drop of blocking diode 2MN. Thus, the photodiode 1MN becomes reverse biased, and the charge in accordance with the applied voltage is accumulated in capacitance Ca. Under the condition, Vj is larger than the absolute value of Vd.

When set in the second bias condition, voltage Vb is applied to the anode of photodiode 1MN without discharging the charge accumulated in capacitance Ca, so that voltage Vj further increases and goes beyond Vt, which is the voltage at the anode of blocking diode 2MN, so that photodiode 1MN and blocking diode 2MN both become reverse biased. When photodiode 1MN and blocking diode 2MN are both reverse biased, the charge Qj at the junction between them does not change as long as the reversed bias condition is maintained. However, since current Iph flows through photodiode 1MN when irradiated by light, the charge Qj changes by Iph·t. That is, in the charge accumulation mode, photodiode 1MN and blocking diode 2MN are reverse biased (i.e., second, third and fourth bias conditions). Under the condition, since there is a change in charge in accordance with a product of light intensity and irradiation time, if this change in charge is read out as a signal, there is obtained an image signal.

In the accumulation of charge in the matrix driving control system, the read out voltage Vt is applied at the same time to a plurality of photoelectric elements for reading out a signal; however, all of the elements, excepting a single element for carrying out a read out operation, must be maintained in the charge accumulation mode. In order to maintain the charge accumulation mode with voltage Vt applied to one end of a photoelectric element, a predetermined voltage (Vb in this example) must be applied to the other end as in the second bias condition.

The operation of the structure shown in FIG. 2 will be described with reference to FIG. 3a. In the illustrated embodiment, pulse signals $\phi x1, \phi x2, \phi x3, \ldots$, which are shifted in phase by a half pulse width (T/2) from one another, are sequentially and repetitively applied to the switching elements S3 and S4 in the row line driving circuit connected to the anodes of photodiodes 1MN. On the other hand, to the switching elements S1 and S2 provided in the column driving circuit connected to the anodes of blocking diodes 2MN are applied number of pulses, which are respectively shifted in phase by T/2n, within the time period of half pulse width (T/2) of a signal applied to each of the switching elements S4 in the row line driving circuit and this is repetitively carried out.

Focusing on photodiode 121 located in the second row and first column at time t1, since time of (m−1)·T/2 has already elapsed upon completion of the last signal reading operation from this photodiode and photodiode 121 and blocking diode 221 have been biased in the charge accumulation mode, signal charge corresponding to the intensity of light irradiation has been accumulated at the junction between photodiode 121 and blocking diode 221. When signal $\phi y1$ becomes Hi at time t1, a charge accumulation unit comprised of photodiode 121 and blocking diode 221 is set in the first bias condition, i.e., signal read out mode, so that the accumulated signal charge is read out at the output terminal of group b. In the signal read out condition, in which voltage Vt is applied, signal $\phi xr$ becomes Hi to turn the switching element S5b on and the charge thus read out flows to amplifier AM2. The resulting current includes a signal current component and a dark current component.

On the other hand, focusing on photodiode in the first row and first column at time t1, the charge thus far accumulated by signal $\phi y1$ applied at timing t0 which is earlier than time t1 by time interval T/2 is discharged and it has been again biased in the charge accumulation mode since time t0. Accordingly, charge has been accumulated in the charge accumulation unit 111/211 at time t1 in accordance with light intensity and time T/2; however, since m−1 is much larger than unity and this accumulated charge may be regarded as substantially zero, the current flowing at this time consists only of dark current. This current is read out at the output terminal of group a through the switching elements S4. At timing t1, switching element S5a is turned on and the dark current read out is applied to current amplifier AM1.

That is, at time t1, amplifier AM1 amplifies the dark current of photodiode 111 of group a and at the same time amplifier AM2 amplifies the signal current and dark current of photodiode 211 of group b. Therefore, there is obtained a difference between these two signals at the output terminal of differential amplifier DFA.

In this type of photodiode array, some differences in characteristics, e.g., dark current, are present between individual photodiodes, but such differences are relatively small. Moreover, changes of dark current due to temperature and the like occur in the same direction for all of the photodiodes. In other words, no appreciable error is produced even if the dark current of a particular photoelectric element is replaced by the dark current of another photoelectric element. As a result, an output signal obtained from differential amplifier DFA has a true level without the dark current component.

Figure 4:
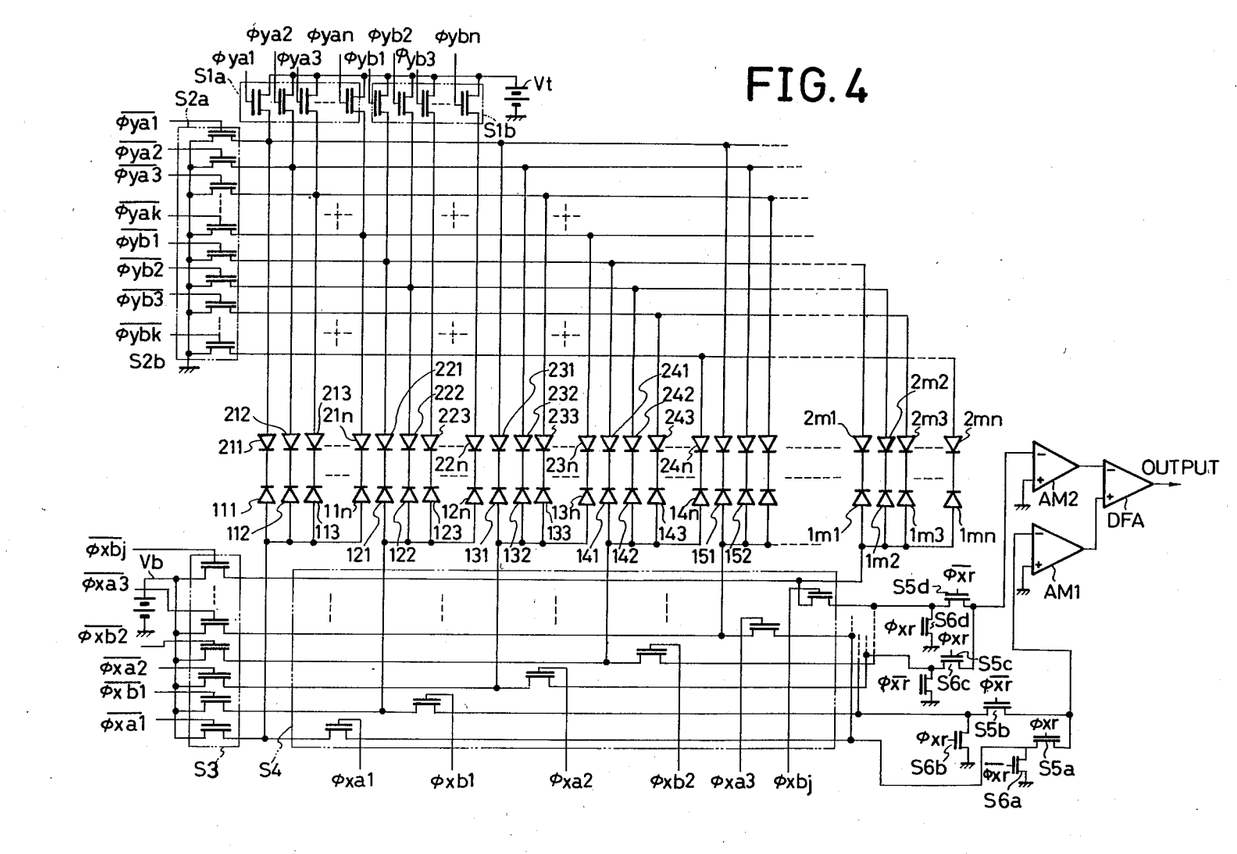
FIG. 4 is a circuit diagram illustrating the overall structure of an image sensor constructed in accordance with another embodiment of the present invention.

FIG. 4 illustrates another embodiment of the present invention, in which the column driving lines connected to the anodes of blocking diodes 2MN are divided into two groups: group a and group b, and they are divided into 2n groups in total. Each of the column lines is connected to voltage source Vt through switching element S1a or S1b and to ground through switching element S2a or S2b. The output terminals of switching elements S4 connected to the respective row lines which, in turn, are connected to the respective anodes of pnotodiodes 1MN are divided into four groups: first group with row M equal to p (p=1−m/4), second group with row M equal to 1+p, third group with row M equal to 2+p, and fourth group with M equal to 3+p. In each of these four groups, paired switching elements S5a and S6a, S5b and S6b, S5c and S6c, and S5d and S6d are provided, respectively. Switching elements S5a and S5b have their output terminals commonly connected to the inverting input terminal of current amplifier AM1, and switching elements S5c and S5d have their output terminals commonly connected to the inverting input terminal of current amplifier AM2.

In operation, while the back gate voltage Vb is applied to the anode of each of photodiodes 1MN, charge is accumulated in the parasitic capacitance present in each of the row groups. The charge thus accumulated is discharged by removing voltage Vb from the anode of photodiode 1MN and connecting the anode to a desired portion. Therefore, if a signal charge read out operation from each of the photodiodes is carried out immediately after the removal of back gate voltage Vb, then the discharging current from the parasitic capacitance is superposed on the signal current.

Since the discharging current from the parasitic capacitance is in a differentiated wave form, it becomes non-influential if some time have elapsed after initiation of discharge. However, if a wait time period is to be provided in view of this, the overall signal read out time period becomes longer thereby hindering to carry out a high speed image reading operation. As described already, the reason why back gate voltage Vb is applied is to maintain the charge accumulation condition for the photoelectric elements from which no signal is to be read out even if signal read out voltage Vt is applied.

Under the circumstances, in the present embodiment, there are provided column driving lines, to which signal read out voltage Vt is applied, twice as many and they are divided into two groups: group a (row) and group b (column). And by shifting the timing of application of voltage Vt to groups a and b, it is made possible to remove voltage Vb from the two row lines (groups a and b) at the same timing. Furthermore, with the charge accumulation unit connected to one of the row lines operating in the noise current discharging mode from the parasitic capacitance and the other charge accumulation unit operating in the signal charge read out mode and by setting the signal charge read out mode following the noise current discharge mode, noise current is prevented from being outputted from the parasitic capacitance in the signal charge read out mode.

Figure 5:
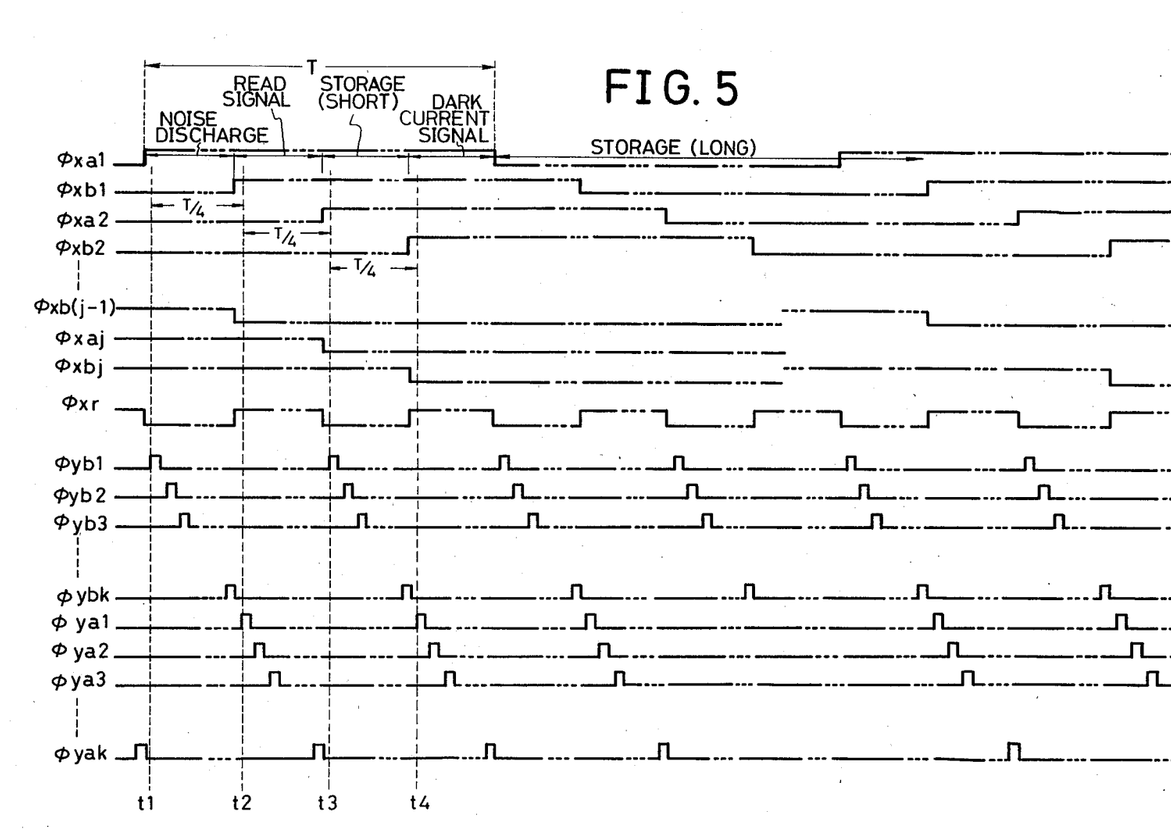
FIG. 5 is a timing chart which is useful for understanding the operation of the structure shown in FIG. 4.

FIG. 5 shows the timing of several signals which are applied to the circuit of FIG. 4. It is to be noted that, in this embodiment, characters "k" and "j" indicate n/2 and m/2, respectively. Now, the operation of the circuit shown in FIG. 4 will be described with reference to FIG. 5. The following description will be focused on charge accumulation units 111/211, 121/221, 131/231 and 141/241 located in the first column of each of the first, second, third and fourth rows. At time t1, signal $\phi$xal becomes Hi so that one of the switching elements S4 which receives this signal is turned on and one of the switching elements S3 which receives its complementary signal is turned off. Thus, the anode of photodiode 111 is connected to the output terminal of group a, and, yet, since signal $\phi$xr is Lo, the switching element S6a is turned on to have the anode of photodiode 111 connected to ground.

Therefore, the charge accumulated in the parasitic capacitance of the first row is discharged to ground at this timing. However, since voltage Vt is not applied to the anode of blocking diode 211 at this timing (i.e., during T/4 from t1), the charge accumulation unit 111/211 is in the charge (signal) accumulation mode. At this timing, since signals $\phi$xb1, $\phi$xa2 and $\phi$xb2 are Lo, the back gate voltage Vb is applied to the other charge accumulation units (excepting m row).

Then, at time t2, signal $\phi$xal holds the Hi condition and signal $\phi$xbl is inverted to Hi. At this timing, the charge accumulation unit 121/221 functions in a manner similar to that of charge accumulation unit 111/211 at time t1. Also at this time, signal $\phi$ybl becomes Hi and the signal read out voltage Vt is applied to the charge accumulation unit 121/221 so that signal charge is read out from the unit 121/221.

The period of reading out a signal from each of the charge accumulation unit is m·T/4, and, as will be described later, a signal read out operation takes place twice during a single signal read out period, so that the time of TL (=(m−2)·T/4) will have elapsed until time t2 is reached from the last signal read out operation at some time before t2. That is, during that relatively long time period TL, the charge accumulation unit 111/211 is placed in the charge accumulation condition, so that there is read out signal charge in accordance with time TL and intensity of light irradiation.

Furthermore, at time t1, since time T/2 has already elapsed after removal of voltage Vb, the noise charge stored in the parasitic capacitance associated with the row lines connected to the charge accumulation unit 111/211, such as first row line, has already been completely discharged at time t2, and, thus, it is not included in a signal read out at time t2. At this timing t2, signal $\phi$xr is Hi and the switching element S5a is turned on, so that the signal current read out flows to amplifier AM1. Then, at time t3, signals $\phi$xa1 and $\phi$xb1 maintain the Hi condition and signal $\phi$xa2 becomes Hi. At this timing, the charge accumulation units 121/221 and 131/231 function similarly with the units 111/211 and 121/221 at time t2. Also at this time, signal Oyal remains Lo so that the charge accumulation unit 111/211 is in the charge accumulation mode.

Then, at time t4, signals φxa1, φxb1 and φxa2 maintain the Hi condition and signal φxb2 also becomes Hi. At this timing, the charge accumulation units 121/221, 131/231 and 141/241 function in the same manner as the charge accumulation units 111/211, 121/221 and 131/231. Also at this time, signal φya1 becomes Hi and the charge accumulation unit 111/211 is set in the charge read out mode. Focusing on the charge accumulation unit 111/211, prior to time t4, since the charge accumulation mode has been maintained for a time period of T/2 after the charge read out operation at time t2, there is read out charge in accordance with time T/2 and intensity of light irradiation at time t4. However, since m−1 is much larger than unity, time period T/2 is extremely short and the amount of charge at this time may be regarded as substantially zero. Even in this case, the dark current of predetermined level flows.

Focusing on the condition of each of the charge accumulation units at timing t4, the charge accumulation unit 141/241 discharges the noise current from the parasitic capacitance to ground through the switching element S6d and the charge accumulation unit 131/231 applies the charge and dark current in accordance with time TL and intensity of light irradiation to the amplifier AM2 through the switching element S5c; while, the charge accumulation unit 121/221 is in the short charge accumulation condition and the charge accumulation unit 111/211 applies the dark current to the amplifier AM1 through the switching element S5a, as described above. That is, at the output terminal of differential amplifier DFA is obtained a true signal which is not influenced by the noise charge accumulated in the parasitic capacitance and the dark current signal produced in the photodiode itself.

Moreover, every time when time T/4 elapses, the operating conditions in the respective rows are shifted and the same operation as described above will be repetitively carried out at the frequency of m·T/4.

It is to be noted that although not shown specifically, an integrator is provided as connected to the signal output terminal in either of the two embodiments described above.

Figure 6:
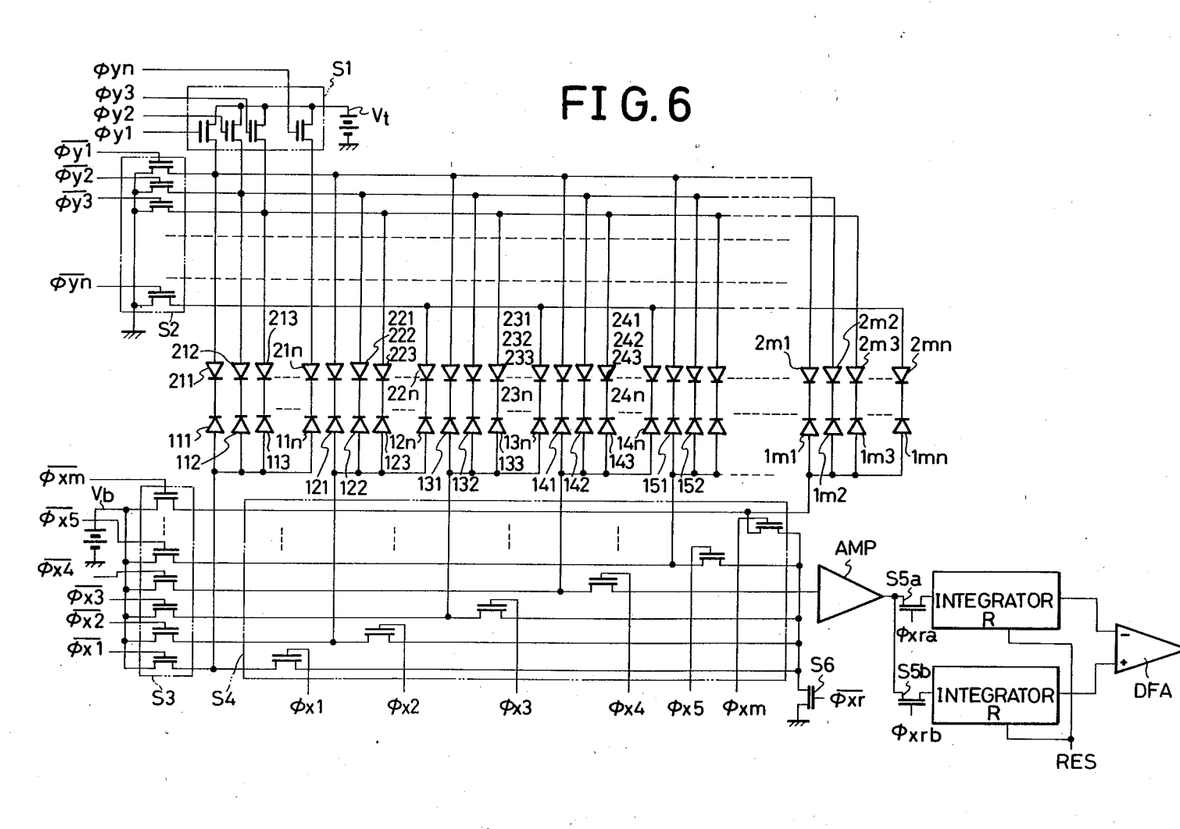
FIG. 6 is a circuit diagram illustrating the overall structure of an image sensor constructed in accordance with a further embodiment of the present invention.

In the above-described embodiments, the level of a signal from the charge accumulation unit which outputs a desired image signal is compensated by the dark current signal from the charge accumulation unit in the same column of the adjacent row. However, compensation of signal level may be similarly carried out by carrying out the signal read out operation twice in succession for the same charge accumulation unit. The structure shown in FIG. 6 may serve for this purpose. With reference to FIG. 6, two switching elements S5a and S5b are provided as connected to the output terminal of amplifier AMP and they are respectively connected to two separate integrators, whose output terminals are connected to input terminals of differential amplifier DFA.

Figure 7:
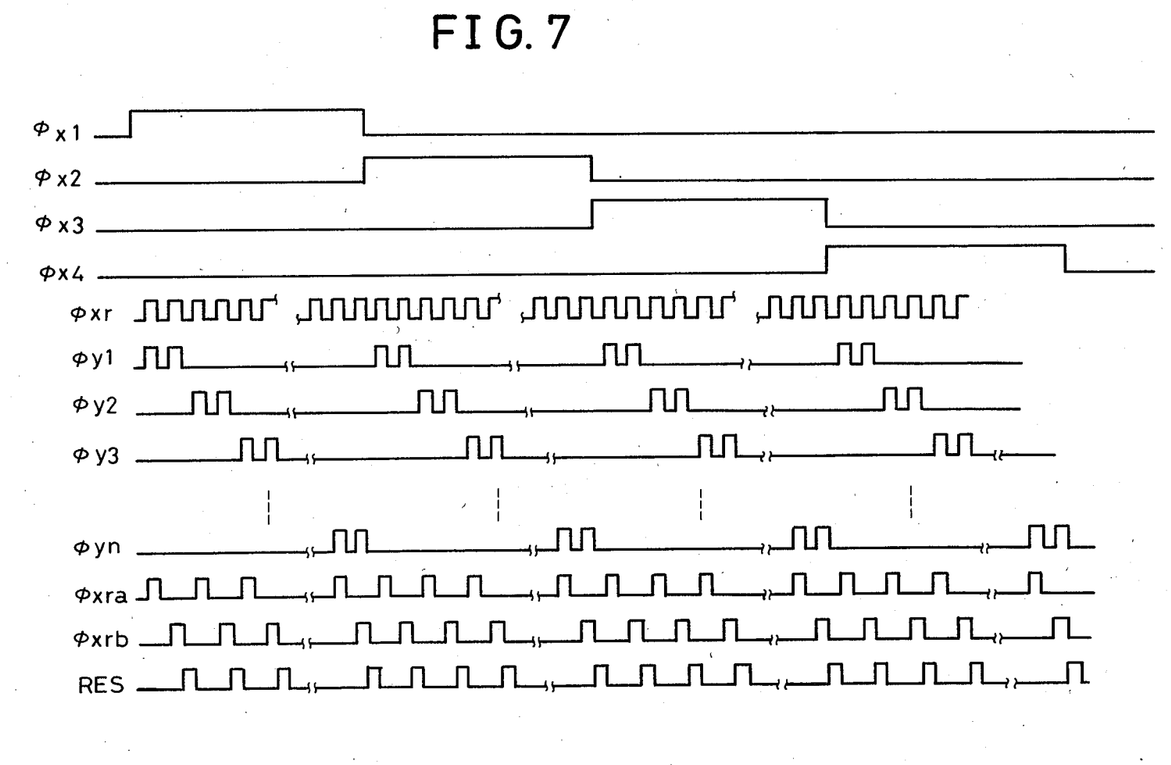
FIG. 7 is a timing chart which is useful for understanding the operation of the structure shown in FIG. 6.

FIG. 7 shows the timing of various signals to be applied to the circuit of FIG. 6. It will be described as focusing on the charge accumulation unit 111/211 with reference to FIGS. 6 and 7. After elapsing a predetermined time period from the timing of rising end of signal φxl, the first pulse appears in signal φyl. During this relatively long time period until this first pulse is applied, the charge accumulation unit 111/211 is maintained in the charge accumulation condition, so that when the first pulse is applied, the charge and dark current signal established in accordance with time and intensity of light irradiation may be read out. In addition, at this timing, signal φxra becomes Hi, so that the switching element S5a is turned on and the signal charge read out is applied to one of the integrators.

To the signal φyl, the second pulse is applied immediately following the first pulse. At this timing, the charge accumulation unit 111/211 is again set in the charge accumulation mode, and since the time period during which the charge accumulation condition is established after termination of the first pulse until application of the second pulse is extremely short, the signal read out at this timing may be considered as a signal having the dark current level.

At the timing of application of this second pulse, signal φxra becomes Lo and signal φxrb becomes Hi, so that the dark current signal is applied to the other integrator. Since the first and second pulses are identical in pulse width, if a difference in level of the two signals at the output terminals of these integrators at the time of termination of application of the second pulse is taken, a true signal free of the dark current may be obtained. The integrated values of the two integrators are reset at the time of completion of signal reading operation.

The above-described embodiments relate to the case in which the photoelectric element array is driven under matrix control, but it is not necessary by all means to carry out matrix control in the present invention. Besides, in the case of the structure shown in FIG. 6, the photoelectric element used may be single in number. Of course, each of the embodiments may be modified partly in structure and the timing of various control signals may be suitably modified without departing the spirit and scope of the present invention.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for controlling the operation of a photoelectric element, comprising:
   a charge accumulating unit having first and second ends and including a photoelectric element and a blocking diode connected to said photoelectric element;
   first voltage applying means for applying a first voltage to said first end of said charge accumulating unit;
   switching means connected between said first end of said charge accumulating unit and a signal output terminal;
   second voltage applying means for applying a second voltage to said second end of said charge accumulating unit; and
   first control means for controlling said first and second voltage applying means and said switching means for selectively establishing a charge accumulation mode and a charge read out mode for said charge accumulating unit, whereby a plurality of charge accumulating and charge read out operations are carried out during a single signal read out operation and at least two charge accumulating time periods are used thereby outputting a signal in accordance with read out charge at a first charge accumulating time period and read out charge at a second charge accumulating time period.

2. The system of claim 1 further comprising means for outputting a signal in accordance with a difference between said read out charge at said first charge accumulating time period and said read out charge at said second charge accumulating time period.

3. The system of claim 2 wherein said photoelectric element and said blocking diode are connected in series and opposite in direction.

4. The system of claim 3 wherein said first voltage is a charge read out inhibiting voltage and said second voltage is a charge read out voltage.

5. The system of claim 1 wherein a plurality of said charge accumulating units are provided to define a photoelectric element array, and said system further comprising:
   first connecting means for commonly connecting said first ends of said charge accumulating units in said photoelectric element array as divided in a plurality of groups;
   third voltage applying means for applying a charge read out inhibiting voltage selectively to each of said groups of said first connecting means;
   signal selecting means for selectively connecting each of said groups of said first connecting means to said signal output terminal;
   second connecting means for commonly connecting said second ends of said charge accumulating units in said photoelectric element array as divided in a plurality of groups;
   fourth voltage applying means for applying a charge read out voltage selectively to each of said groups of said second connecting means;
   second control means for controlling said third and fourth voltage applying means and said signal selecting means thereby establishing a charge accumulating condition or charge read out condition sequentially for each of said charge accumulating units of said photoelectric element array, whereby a plurality of charge accumulation and charge read out operations are carried out for single signal read out operation from one of said charge accumulating units and at least two charge accumulating time periods are used thereby outputting a signal in accordance with read out charge at a first charge accumulating time period and read out charge at a second charge accumulating time period.

6. The system of claim 5 further comprising means for outputting a signal in accordance with said read out charge from a first charge accumulating unit to which said first charge accumulating time period is set and said read out charge from a second charge accumulating unit to which said second charge accumulating time period is set for a single signal read out operation from one of said charge accumulating units.

7. The system of claim 5 wherein said second connecting means is divided into groups of a number which is at least twice of a number of said units connected to each group of said first connecting means to commonly connect those charge accumulating units located corresponding in position in each of said groups of said first connecting means, whereby the application of said charge read out inhibiting voltage is sequentially removed at a partly overlapping timing for at least four groups of said first connecting means and said charge read out voltage is sequentially applied to said second connecting means which is connected to two of the groups for which the timing of said first connecting means overlaps.

* * * * *